US011107468B2

(12) United States Patent
Mese et al.

(10) Patent No.: US 11,107,468 B2
(45) Date of Patent: Aug. 31, 2021

(54) APPARATUS, METHOD, AND PROGRAM PRODUCT FOR CONTEXT-BASED COMMUNICATIONS

(71) Applicant: LENOVO (Singapore) PTE. LTD., New Tech Park (SG)

(72) Inventors: John Carl Mese, Cary, NC (US); Nathan J. Peterson, Oxford, NC (US); Russell Speight VanBlon, Raleigh, NC (US); Mark Patrick Delaney, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 134 days.

(21) Appl. No.: 16/367,147

(22) Filed: Mar. 27, 2019

(65) Prior Publication Data
US 2020/0312319 A1   Oct. 1, 2020

(51) Int. Cl.
*G10L 15/22*  (2006.01)
*H04L 29/08*  (2006.01)

(52) U.S. Cl.
CPC ............ *G10L 15/22* (2013.01); *H04L 67/141* (2013.01)

(58) Field of Classification Search
CPC ........ G01S 7/285; G06F 3/167; G06F 16/683; G06F 3/165; G06F 3/162; G06F 40/20; G10L 15/10; G10L 15/22; G10L 15/30; G10L 17/00; G10L 17/04; G10L 21/0364; G10L 25/63; G10L 15/08; H04L 67/06; H04L 67/141; H04L 5/14; H04L 67/26; H04W 4/20; H04W 8/005; B60K 35/00; G06Q 50/01; G06Q 50/18; H03G 3/34; H04B 1/44; H04R 1/028
USPC .......... 381/56; 704/232, 246, 275; 340/5.53, 340/12.29; 370/329; 379/159; 455/41.1, 455/463; 709/250; 710/36; 715/740
See application file for complete search history.

(56) References Cited

U.S. PATENT DOCUMENTS

| | | | | |
|---|---|---|---|---|
| 4,088,846 | A * | 5/1978 | McEowen | H04M 3/4283 379/156 |
| 4,638,124 | A * | 1/1987 | Hargrave | H04M 9/005 379/159 |
| 5,619,553 | A * | 4/1997 | Young | H04M 1/72505 455/463 |
| 10,083,006 | B1 * | 9/2018 | Feuz | G06F 40/20 |
| 10,284,695 | B1 * | 5/2019 | Gejji | G06F 1/181 |
| 10,748,529 | B1 * | 8/2020 | Milden | G06F 3/167 |
| 10,782,390 | B2 * | 9/2020 | Lien | G01S 7/034 |

(Continued)

*Primary Examiner* — Gerald Gauthier
(74) *Attorney, Agent, or Firm* — Kunzler Bean & Adamson (57) ABSTRACT

Apparatuses, methods, and program products are disclosed for context-based communications. One apparatus includes a processor, a microphone, and a memory that stores code executable by the processor. The code is executable by the processor to receive, via the microphone, information indicating to initiate communications between the apparatus and a second device. The code is executable by the processor to transmit a request for the communications to the second device. The code is executable by the processor to, in response to transmitting the request, receive contextual awareness information corresponding to the second device. The code is executable by the processor to facilitate the communications between the apparatus and the second device based on the contextual awareness information.

20 Claims, 6 Drawing Sheets

(56) References Cited

U.S. PATENT DOCUMENTS

| | | | |
|---|---|---|---|
| 2003/0051058 A1* | 3/2003 | Phong | H04N 1/333 709/250 |
| 2012/0198350 A1* | 8/2012 | Nhiayi | H04N 21/472 715/740 |
| 2013/0024197 A1* | 1/2013 | Jang | H04N 21/4345 704/246 |
| 2013/0080664 A1* | 3/2013 | Gole | G06F 13/385 710/36 |
| 2014/0176313 A1* | 6/2014 | Richardson | G08C 17/00 340/12.29 |
| 2015/0063575 A1* | 3/2015 | Tan | G06F 16/683 381/56 |
| 2015/0208455 A1* | 7/2015 | Yen | H04W 76/14 370/329 |
| 2016/0104486 A1* | 4/2016 | Penilla | G10L 15/005 704/232 |
| 2016/0171980 A1* | 6/2016 | Liddell | G06F 3/167 704/275 |
| 2016/0196703 A1* | 7/2016 | Jean | H04N 7/186 340/5.53 |
| 2016/0198287 A1* | 7/2016 | Hulusi | H04B 5/0056 455/41.1 |
| 2017/0080262 A1* | 3/2017 | Freres | A62B 18/025 |
| 2018/0018967 A1* | 1/2018 | Lang | G10L 15/22 |
| 2018/0213023 A1* | 7/2018 | Cunico | H04W 4/08 |
| 2018/0350364 A1* | 12/2018 | Park | B60K 37/06 |
| 2019/0043521 A1* | 2/2019 | Maziewski | G06F 3/165 |
| 2019/0080692 A1* | 3/2019 | R | G10L 17/00 |
| 2019/0180741 A1* | 6/2019 | Park | G10L 15/22 |
| 2019/0341026 A1* | 11/2019 | Visser | G06F 40/30 |
| 2020/0105254 A1* | 4/2020 | Sarir | H04W 4/20 |
| 2020/0127988 A1* | 4/2020 | Bradley | H04W 8/005 |
| 2020/0234709 A1* | 7/2020 | Kunitake | G06F 3/167 |
| 2020/0312319 A1* | 10/2020 | Mese | H04L 67/141 |

\* cited by examiner

APPARATUS, METHOD, AND PROGRAM PRODUCT FOR CONTEXT-BASED COMMUNICATIONS

BACKGROUND

Field

The subject matter disclosed herein relates to communications and more particularly relates to context-based communications.

Description of the Related Art

Information handling devices, such as desktop computers, laptop computers, tablet computers, smart phones, optical head-mounted display units, smart watches, smart devices, voice-controlled electronic devices, televisions, streaming devices, etc., are ubiquitous in society. These information handling devices may be used for performing various actions. For example, these information handling devices may be used for communication.

BRIEF SUMMARY

An apparatus for context-based communications is disclosed. A method and computer program product also perform the functions of the apparatus. In one embodiment, the apparatus includes a processor, a microphone, and a memory that stores code executable by the processor. The code, in various embodiments, is executable by the processor to receive, via the microphone, information indicating to initiate communications between the apparatus and a second device. The code, in certain embodiments, is executable by the processor to transmit a request for the communications to the second device. The code, in some embodiments, is executable by the processor to, in response to transmitting the request, receive contextual awareness information corresponding to the second device. The code, in various embodiments, is executable by the processor to facilitate the communications between the apparatus and the second device based on the contextual awareness information.

In some embodiments, the information indicating to initiate the communications includes information received from a voice command. In one embodiment, the apparatus is a voice-controlled electronic device.

In various embodiments, the contextual awareness information includes information related to an activity of the second device. In some embodiments, the activity includes playing music, performing a search, providing audible information, or some combination thereof.

A method for context-based communications, in one embodiment, includes receiving, at a first device, information indicating to initiate communications between the first device and a second device. In certain embodiments, the method includes transmitting, from the first device, a request for the communications to the second device. In some embodiments, the method includes, in response to transmitting the request, receiving contextual awareness information corresponding to the second device. In various embodiments, the method includes facilitating the communications between the first device and the second device based on the contextual awareness information.

In some embodiments, the information indicating to initiate the communications includes information received from a voice command. In various embodiments, the first device and the second device are voice-controlled electronic devices. In one embodiment, the contextual awareness information includes information related to an activity of the second device.

In some embodiments, the activity includes playing music, performing a search, providing audible information, or some combination thereof. In certain embodiments, the contextual awareness information includes information related to a user near the second device.

In some embodiments, the contextual awareness information includes an audible response, a setting, a selection, or some combination thereof corresponding to a user of the second device. In various embodiments, the method includes facilitating the communications between the first device and the second device based on a user of the first device. In certain embodiments, the method includes facilitating the communications between the first device and the second device based on a hierarchical relationship corresponding to a first user of the first device and a second user of the second device.

In one embodiment, a program product includes a computer readable storage medium that stores code executable by a processor. The executable code, in certain embodiments, includes code to perform receiving, at a first device, information indicating to initiate communications between the first device and a second device. The executable code, in various embodiments, includes code to perform transmitting, from the first device, a request for the communications to the second device. The executable code, in some embodiments, includes code to perform, in response to transmitting the request, receiving contextual awareness information corresponding to the second device. The executable code, in certain embodiments, includes code to perform facilitating the communications between the first device and the second device based on the contextual awareness information.

In certain embodiments, the contextual awareness information includes information related to an activity of the second device. In one embodiment, the contextual awareness information includes information related to a user near the second device. In certain embodiments, the contextual awareness information includes an audible response, a setting, a selection, or some combination thereof corresponding to a user of the second device.

In various embodiments, the executable code further includes code to perform facilitating the communications between the first device and the second device based on a user of the first device. In some embodiments, the executable code further includes code to perform facilitating the communications between the first device and the second device based on a hierarchical relationship corresponding to a first user of the first device and a second user of the second device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
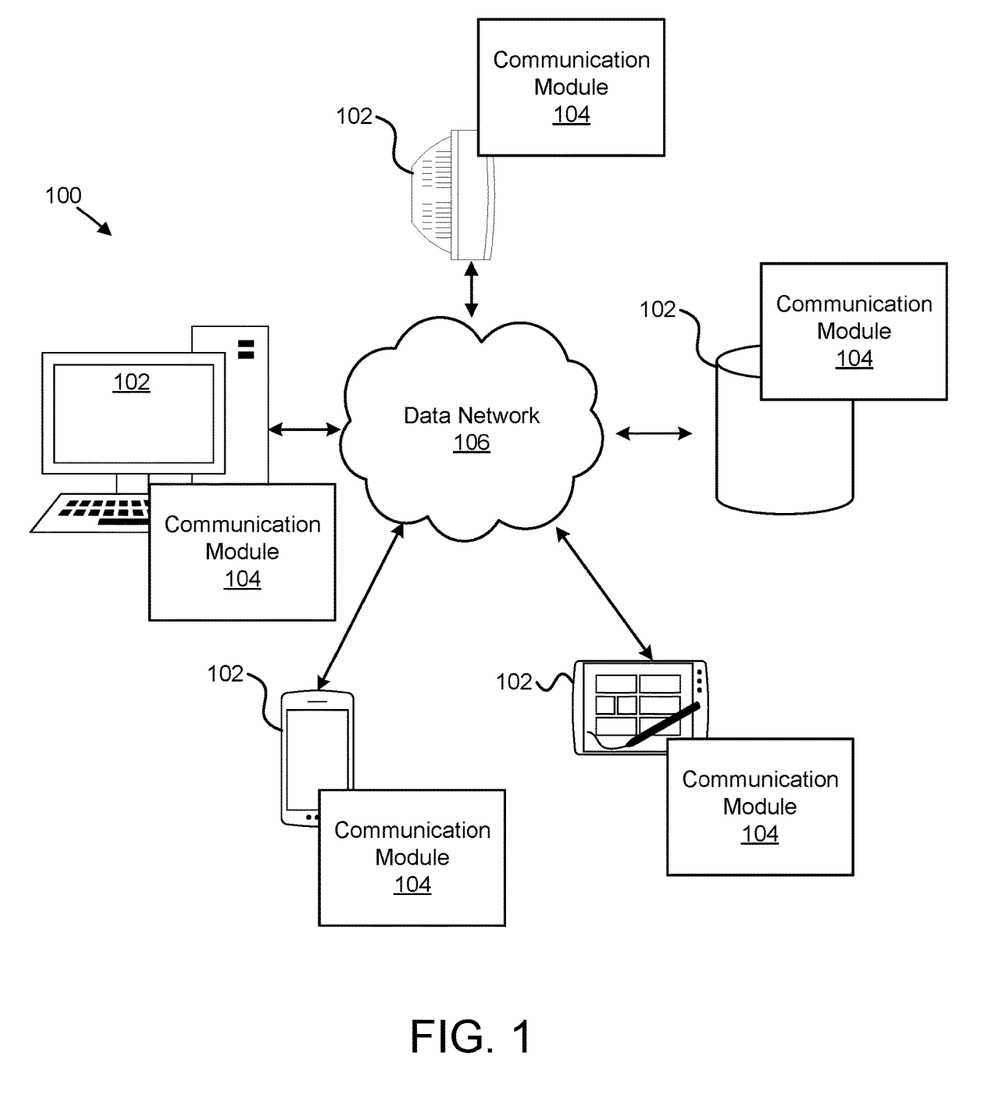
FIG. 1 is a schematic block diagram illustrating one embodiment of a system for context-based communications.

FIG. 1 depicts one embodiment of a system 100 for context-based communications. In one embodiment, the system 100 includes information handling devices 102, communication modules 104, and data networks 106. Even though a specific number of information handling devices 102, communication modules 104, and data networks 106 are depicted in FIG. 1, one of skill in the art will recognize that any number of information handling devices 102, communication modules 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, smart devices, voice-controlled electronic devices, digital assistants, or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the communication module 104. In certain embodiments, the communication module 104 may receive, via a microphone, information indicating to initiate communications between an information handling device 102 and a second device (e.g., another information handling device 102). The communication module 104 may also transmit a request for the communications to the second device. The communication module 104 may, in response to transmitting the request, receive contextual awareness information corresponding to the second device. The communication module 104 may also facilitate the communications between the information handling device 102 and the second device based on the contextual awareness information. In this manner, the communication module 104 may be used for context-based communications.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
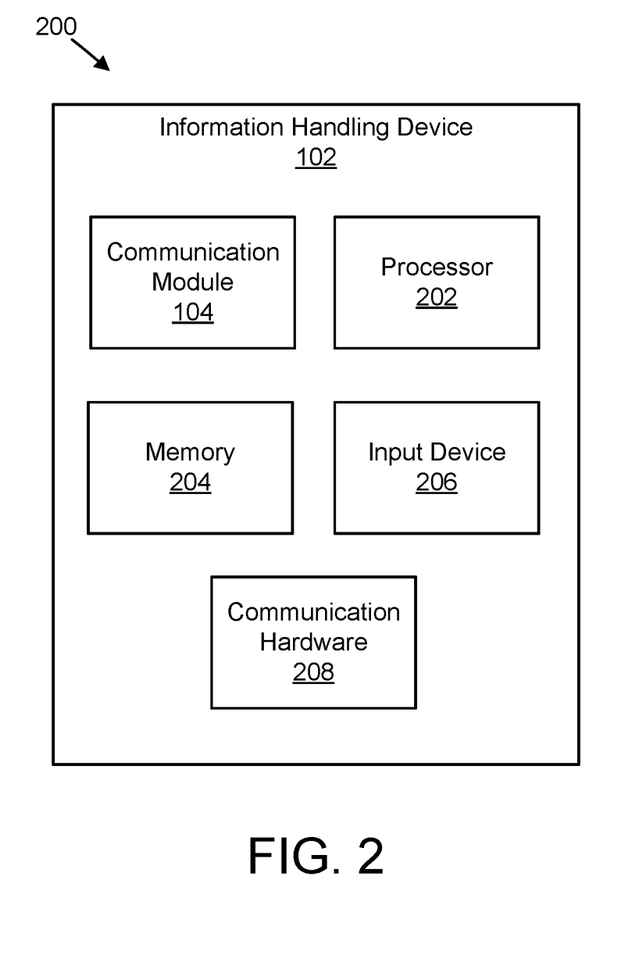
FIG. 2 is a schematic block diagram illustrating one embodiment of an apparatus including an information handling device.

FIG. 2 depicts one embodiment of an apparatus 200 that may be used for context-based communications. The apparatus 200 includes one embodiment of the information handling device 102. Furthermore, the information handling device 102 may include the communication module 104, a processor 202, a memory 204, an input device 206, and communication hardware 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the communication module 104, the input device 206, and the communication hardware 208.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to communications. In some embodiments, the memory 204 also stores program code and related data, such as an operating system or other controller algorithms operating on the information handling device 102.

The information handling device 102 may use the communication module 104 for context-based communications. As may be appreciated, the communication module 104 may include computer hardware, computer software, or a combination of both computer hardware and computer software. For example, the communication module 104 may include circuitry, or a processor, used to receive, via a microphone (e.g., the input device 206), information indicating to initiate communications between the information handling device 102 and a second device (e.g., another information handling device 102). As another example, the communication module 104 may include computer program code that transmits a request for the communications to the second device. As a further example, the communication module 104 may include computer program code that, in response to transmitting the request, receives contextual awareness information corresponding to the second device. As an additional example, the communication module 104 may include computer program code that facilitates the communications between the apparatus and the second device based on the contextual awareness information.

The input device 206, in one embodiment, may include any known computer input device including a touch panel, a button, a keyboard, a stylus, a microphone, or the like. In some embodiments, the input device 206 includes two or more different devices, such as a button and a microphone. The communication hardware 208 may facilitate communication with other devices. For example, the communication hardware 208 may enable communication via Bluetooth®, Wi-Fi, and so forth.

Figure 3:
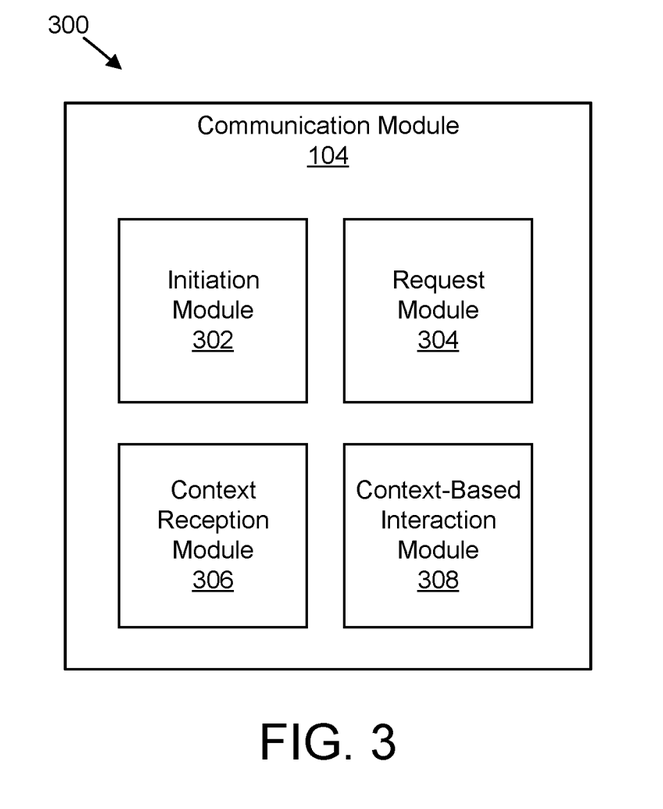
FIG. 3 is a schematic block diagram illustrating one embodiment of an apparatus including a communication module.

FIG. 3 depicts a schematic block diagram illustrating one embodiment of an apparatus 300 that includes one embodiment of the communication module 104. Furthermore, the communication module 104 includes an initiation module 302, a request module 304, a context reception module 306, and a context-based interaction module 308.

In certain embodiments, the initiation module 302 may receive, at a first device (e.g., a first information handling device 102), information indicating to initiate communications between the first device and a second device (e.g., a second information handling device 102). In some embodiments, the information indicating to initiate the communications may include information received from a voice command. In various embodiments, the information indicating to initiate the communications may include information received from a button, a keyboard, and/or the like. In certain embodiments, the information indicating to initiate communications may indicate that communications with the second device are desired. For example, in such an embodiment, the information received from a voice command may be "Start device-to-device communications with John's device." In some embodiments, the information indicating to initiate communications may indicate one or more users desired to have communications with. For example, in such an embodiment, the information received from a voice command may be "Start device-to-device communications with John."

In certain embodiments, the communications may be intercom communications or device-to-device communications. As may be appreciated, intercom communications or device-to-device communications may include audio and/or video communications between at least two information handling devices 102 via a network. In some embodiments, the network may not include (e.g., exclude) cellular communications (e.g., phone calls). For example, the intercom communications may not include (e.g., exclude) phone calls. In various embodiments, the network may be a WiFi® network, a Bluetooth® network, a wireless network, a wired network, an ethernet network, and/or the like.

In certain embodiments, the first device and the second device are voice-controlled electronic devices. As may be appreciated, voice-controlled electronic devices may be primarily controlled using voice commands (e.g., other input mechanisms may be limited such as not using a mouse, not using a keyboard, only having less than 6 buttons).

In one embodiment, the request module 304 may transmit, from the first device, a request for the communications to the second device. The request for communications may indicate the desire for the first device to have communications with the second device, but may not start communications with the second device without the first device receiving feedback corresponding to the second device. The second device may receive the request and feedback may be provided to the first device to indicate information (e.g., contextual awareness information) corresponding to the second device.

In various embodiments, the context reception module 306 may, in response to transmitting the request (or sometimes before transmitting the request), receive contextual awareness information corresponding to the second device. While the contextual awareness information corresponds to the second device, the contextual awareness information may be transmitted from the second device or from another device, such as a network device.

The contextual awareness information may include information related to an activity of the second device. For example, the activity of the second device may include playing music, performing a search, providing audible information, and/or the like. In some embodiments, the contextual awareness information includes information related to a user near the second device. For example, the second device or another device may detect one or more users that are near the second device and the contextual awareness information may indicate the one or more users that are near the second device. The one or more users may be detected using voice detection, video detection, an electronic device worn by a user (e.g., phone, watch, activity monitor, activity tracker, etc.), and/or the like. In embodiments in which the context reception module 306 receives contextual awareness information corresponding to the second device before transmitting the request, the contextual awareness information may indicate the second device corresponding to the user desired to be contacted.

In various embodiments, the contextual awareness information includes an audible response, a setting, a selection, and/or the like corresponding to a user of the second device. For example, the second device may ask the user of the second device if they accept the request for communications with the first device. The second device may ask the user using an audible alert, an audible message, an audible sound, a notification light, information on a smart screen, and/or the like. In response to the second device asking the user of the second device if they accept the request, the user may provide an audible response and/or a selection to indicate whether they accept the request. In some embodiments, a setting corresponding to the second device may indicate whether the user of the second device accepts the request. In certain embodiments, a user of the second device may select a button or other setting to indicate that communications with the second device are not permitted. In such embodiments, an audible alert, a notification light, and/or a smart screen may indicate that communications with the second device are not permitted.

As described, a user of the second device may indicate whether they accept communications from the first device. For example, a requesting user (Vanessa) near a first device may want to initiate intercom communications with a second device near John. John is listening to music on the second device. The second device asks John if he would like to have intercom communications (e.g., via an audible question with or without pausing the music, via a visible light notification, via a visual prompt). The first device receives information indicating whether John would like to have intercom communications. In response to John indicating that he wants to proceed with intercom communications, the music playing on the second device stops and intercom communications between the first device and the second device begin. In response to John indicating that he does not want to proceed with intercom communications, no intercom communications between the first device and the second device occur.

In some embodiments, the context-based interaction module 308 may facilitate the communications between the first device and the second device based on the contextual awareness information. As may be appreciated, facilitating the communications may include starting communications, carrying voice and/or video between the first device and the second device to enable two-way communications, and/or so forth. The contextual awareness information may indicate whether the communications between the first device and the second device are authorized and/or approved.

For example, the context awareness information may indicate that the second device is in a do-not-disturb mode, so communications between the first device and the second device are not authorized. As another example, the context awareness information may indicate that the second device is busy playing music or performing another action, so communications between the first device and the second device are not authorized. As a further example, the context awareness information may indicate that no users are near the second device, so communications between the first device and the second device will not proceed. As an additional example, the context awareness information may indicate that a desired user is near the second device and that communication with the desired user is authorized, so communications between the first device and the second device will proceed. As yet another example, the context awareness information may indicate that that the second device is not busy, so communications between the first device and the second device will proceed.

In some embodiments, the context-based interaction module 308 may ask the user requesting communication whether the user would like to proceed with communications based on the contextual information received corresponding to the second device. For example, a requesting user (Vanessa) near a first device may want to initiate intercom communications with a second device near John. John is listening to music on the second device. The first device receives information indicating that John is listening to music on the second device. The first device notifies Vanessa that John is currently playing music and asks Venessa whether she wants to proceed with intercom communications. In response to Vanessa indicating that she wants to proceed with intercom communications, the music playing on the second device is stopped and intercom communications between the first device and the second device begin. In response to Venessa indicating that she does not want to proceed with intercom communications, no intercom communications between the first device and the second device occur.

Figure 4:
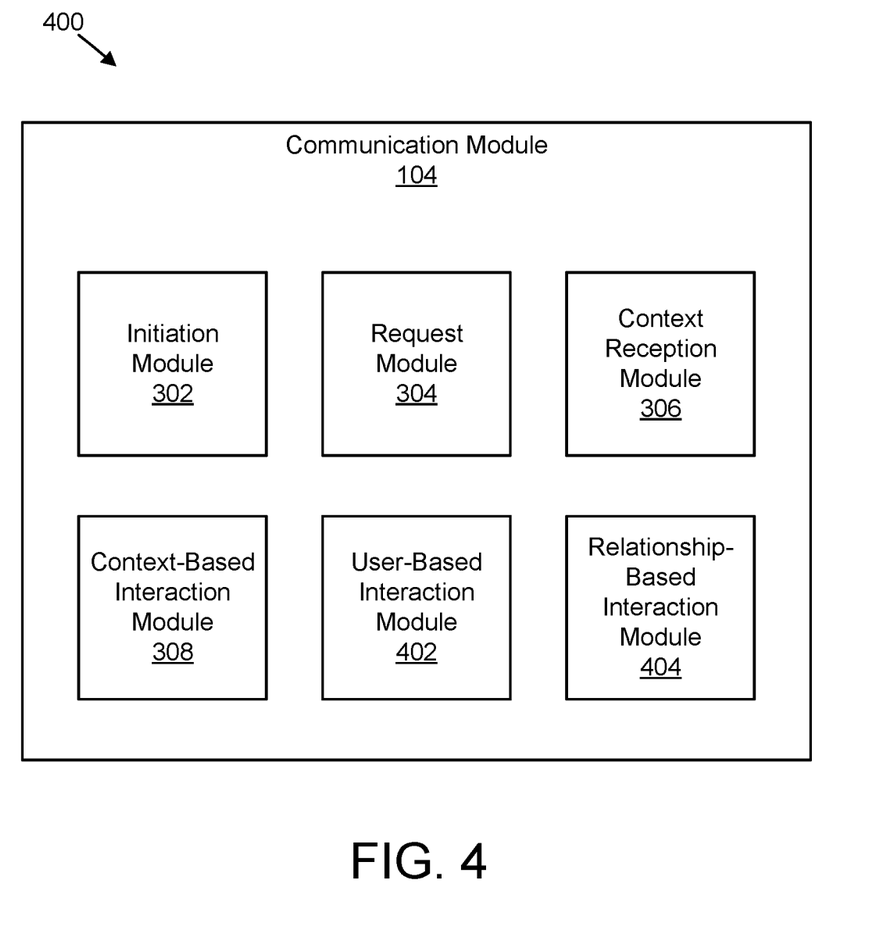
FIG. 4 is a schematic block diagram illustrating another embodiment of an apparatus including a communication module.

FIG. 4 is a schematic block diagram illustrating another embodiment of an apparatus 400 that includes one embodiment of the communication module 104. Furthermore, the communication module 104 includes one embodiment of the initiation module 302, the request module 304, the context reception module 306, and the context-based interaction module 308, that may be substantially similar to the initiation module 302, the request module 304, the context reception module 306, and the context-based interaction module 308 described in relation to FIG. 3. The communication module 104 also includes a user-based interaction module 402 and a relationship-based interaction module 404.

In certain embodiments, the user-based interaction module 402 may facilitate the communications between the first device and the second device based on a user of the first device (e.g., because of who the user is, because of a status of the user, etc.). For example, a requesting user (John) near a first device may want to initiate intercom communications with a second device near Max. John is a primary account holder. Max is listening to music on the second device. The second device notifies the first device that music is playing on the second device. In one embodiment, because John is the primary account holder, the music playing on the second device may be stopped and intercom communications between the first device and the second device may begin regardless of the fact that music is playing on the second device. In another embodiment, John may be notified that music is playing on the second device, but John is given an option to decide whether to proceed with intercom communications. In response to John indicating that he wants to proceed with intercom communications, the music playing on the second device is stopped and intercom communications between the first device and the second device begin. In response to John indicating that he does not want to proceed with intercom communications, no intercom communications between the first device and the second device occur.

In various embodiments, the relationship-based interaction module 404 may facilitate the communications between the first device and the second device based on a hierarchical relationship corresponding to a first user of the first device and a second user of the second device. The hierarchical relationship may be a parent child relationship, an account owner to non-account owner relationship, a first priority user to second priority user relationship, and/or the like. In one embodiment, a lower priority user (e.g., child, non-account owner, second priority user) in a relationship may have to ask permission from a higher priority user (e.g., parent, account owner, first priority user) in the relationship to initiate communications.

For example, a requesting user (John) near a first device may want to initiate intercom communications with a second device near Max. John is a parent to Max. Max is listening to music on the second device. The second device notifies the first device that music is playing on the second device. In one embodiment, because John is Max's parent, the music playing on the second device may be stopped and intercom communications between the first device and the second device may begin regardless of the fact that music is playing on the second device. In another embodiment, John may be notified that music is playing on the second device, but John is given an option to decide whether to proceed with intercom communications. In response to John indicating that he wants to proceed with intercom communications, the music playing on the second device is stopped and intercom communications between the first device and the second device begin. In response to John indicating that he does not want to proceed with intercom communications, no intercom communications between the first device and the second device occur.

As another example, a requesting user (Max) near a first device may want to initiate intercom communications with a second device near John. John is a parent to Max. John is listening to music on the second device. The second device notifies the first device that music is playing on the second device. In one embodiment, because John is Max's parent, communications between the first device and the second device are not allowed either solely because John is the parent, or because John is the parent and John is listening to music. In another embodiment, John may be notified of the request for intercom communications, and John is given an option to decide whether to proceed with intercom communications. In response to John indicating that he wants to proceed with intercom communications, the music playing on the second device is stopped and intercom communications between the first device and the second device begin. In response to John indicating that he does not want to proceed with intercom communications, no intercom communications between the first device and the second device occur.

Figure 5:
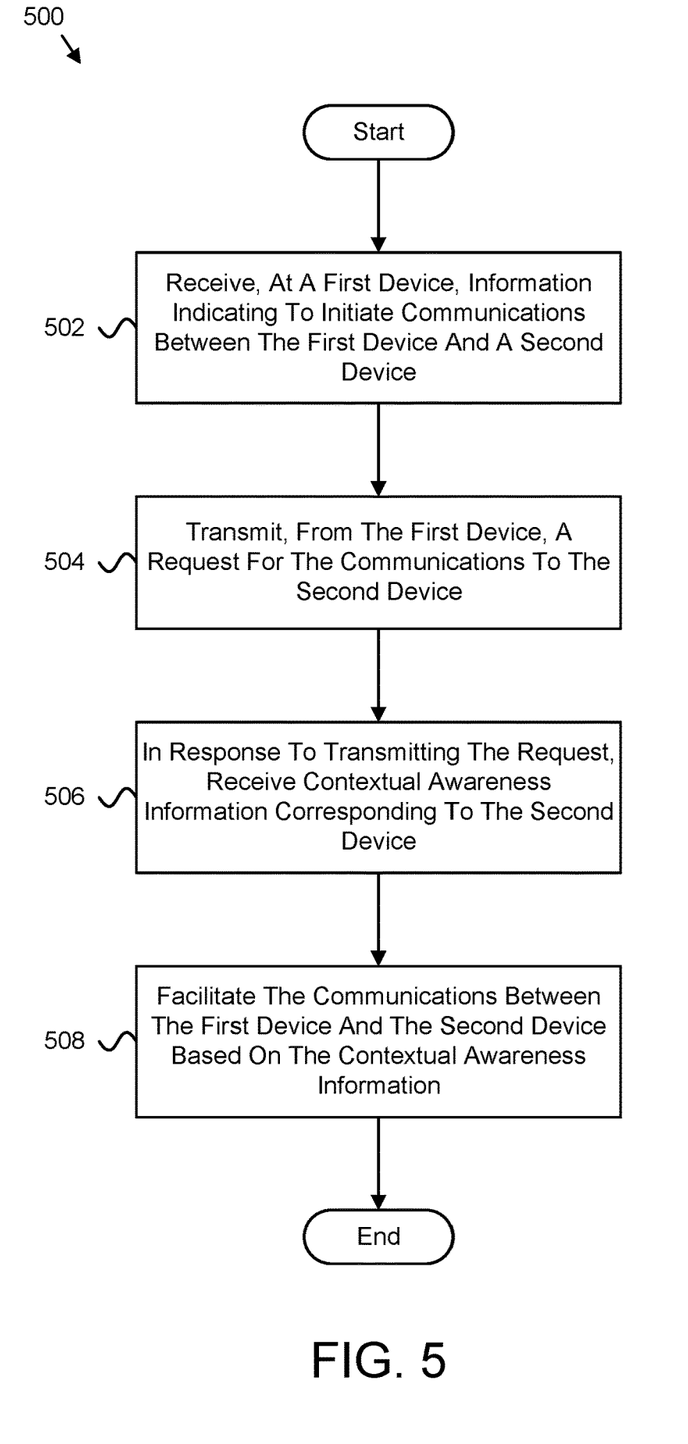
FIG. 5 is a schematic flow chart diagram illustrating an embodiment of a method for context-based communications.

FIG. 5 is a schematic flow chart diagram illustrating an embodiment of a method 500 for context-based communications. In some embodiments, the method 500 is performed by an apparatus, such as the information handling device 102. In other embodiments, the method 500 may be performed by a module, such as the communication module 104. In certain embodiments, the method 500 may be performed by a processor executing program code, for example, a microcontroller, a microprocessor, a CPU, a GPU, an auxiliary processing unit, a FPGA, or the like.

The method 500 may include receiving 502, at a first device (e.g., a first information handling device 102), information indicating to initiate communications between the first device and a second device (e.g., a second information handling device 102). In certain embodiments, the initiation module 302 may receive 502 the information indicating to initiate the communications between the first device and the second device. In some embodiments, the information indicating to initiate the communications includes information received from a voice command. In various embodiments, the first device and the second device are voice-controlled electronic devices.

The method 500 may include transmitting 504, from the first device, a request for the communications to the second device. In some embodiments, the request module 304 may transmit 504 the request for the communications to the second device.

The method 500 may include, in response to transmitting the request, receiving 506 contextual awareness information corresponding to the second device. In some embodiments, the context reception module 306 may, in response to transmitting the request, receive 506 the contextual awareness information corresponding to the second device. In certain embodiments, the contextual awareness information includes information related to an activity of the second device. In various embodiments, the activity includes playing music, performing a search, providing audible information, and/or the like. In some embodiments, the contextual awareness information includes information related to a user near the second device. In certain embodiments, the contextual awareness information includes an audible response, a setting, a selection, and/or the like corresponding to a user of the second device.

The method 500 may include facilitating 508 the communications between the first device and the second device based on the contextual awareness information, and the method 500 may end. In some embodiments, the context-based interaction module 308 may facilitate 508 the communications between the first device and the second device based on the contextual awareness information.

In various embodiments, the method 500 includes facilitating the communications between the first device and the second device based on a user of the first device. In certain embodiments, the method 500 includes facilitating the communications between the first device and the second device based on a hierarchical relationship corresponding to a first user of the first device and a second user of the second device.

Figure 6:
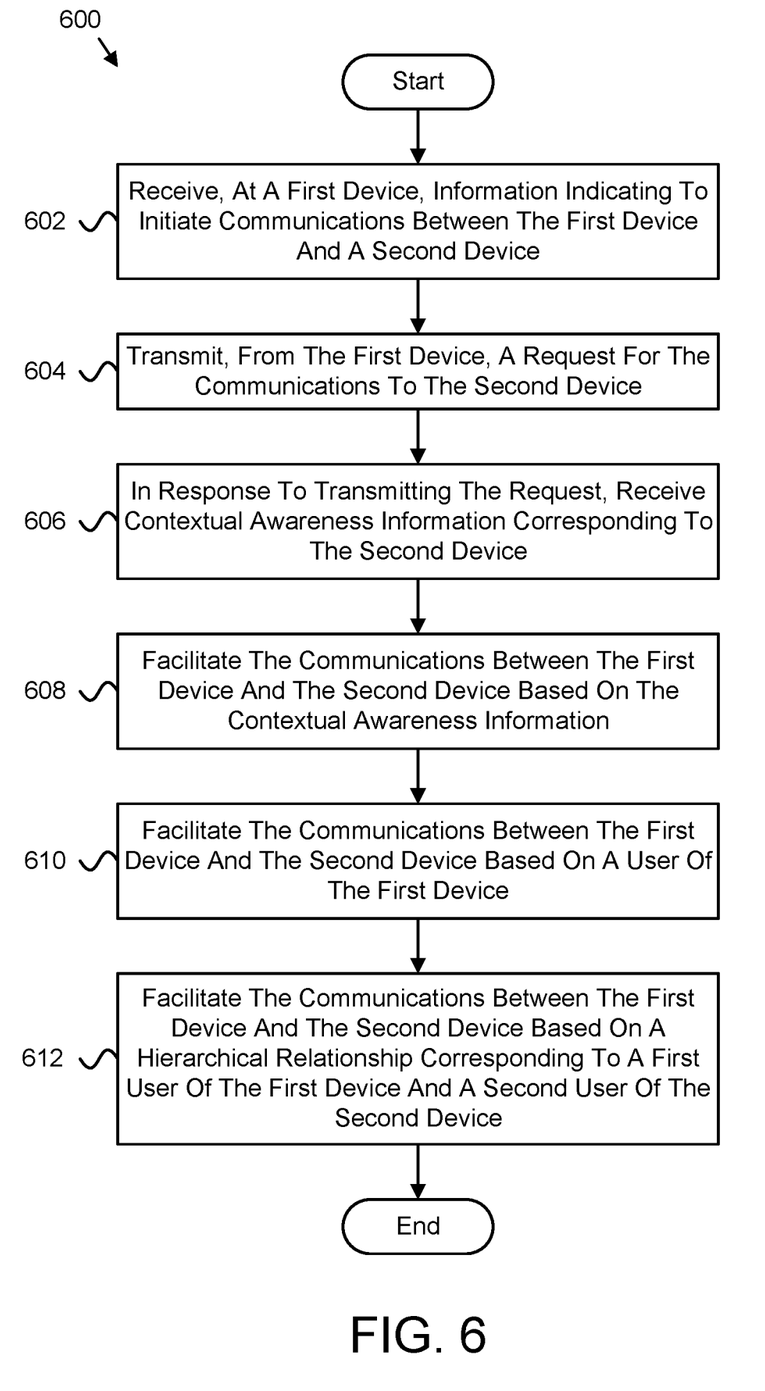
FIG. 6 is a schematic flow chart diagram illustrating another embodiment of a method for context-based communications.

FIG. 6 is a schematic flow chart diagram illustrating another embodiment of a method 600 for context-based communications. In some embodiments, the method 600 is performed by an apparatus, such as the information handling device 102. In other embodiments, the method 600 may be performed by a module, such as the communication module 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602, at a first device (e.g., a first information handling device 102), information indicating to initiate communications between the first device and a second device (e.g., a second information handling device 102). In certain embodiments, the initiation module 302 may receive 602 the information indicating to initiate the communications between the first device and the second device. In some embodiments, the information indicating to initiate the communications includes information received from a voice command. In various embodiments, the first device and the second device are voice-controlled electronic devices.

The method 600 may include transmitting 604, from the first device, a request for the communications to the second device. In some embodiments, the request module 304 may transmit 604 the request for the communications to the second device.

The method 600 may include, in response to transmitting the request, receiving 606 contextual awareness information corresponding to the second device. In some embodiments, the context reception module 306 may, in response to transmitting the request, receive 606 the contextual awareness information corresponding to the second device. In certain embodiments, the contextual awareness information includes information related to an activity of the second device. In various embodiments, the activity includes playing music, performing a search, providing audible information, and/or the like. In some embodiments, the contextual awareness information includes information related to a user near the second device. In certain embodiments, the contextual awareness information includes an audible response, a setting, a selection, and/or the like corresponding to a user of the second device.

The method 600 may include facilitating 608 the communications between the first device and the second device based on the contextual awareness information. In some embodiments, the context-based interaction module 308 may facilitate 608 the communications between the first device and the second device based on the contextual awareness information.

The method 600 includes facilitating 610 the communications between the first device and the second device based on a user of the first device. In certain embodiments, the user-based interaction module 402 may facilitate 610 the communications between the first device and the second device based on the user of the first device.

The method 600 may include facilitating 612 the communications between the first device and the second device based on a hierarchical relationship corresponding to a first user of the first device and a second user of the second device, and the method 600 may end. In various embodiments, the relationship-based interaction module 404 may facilitate 612 the communications between the first device and the second device based on the hierarchical relationship corresponding to the first user of the first device and the second user of the second device.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a microphone; and
a memory that stores code executable by the processor to:
receive, via the microphone, information indicating to initiate intercom communications between the apparatus and a second device;
transmit a request for the intercom communications to the second device;
in response to transmitting the request, receive contextual awareness information corresponding to an ability of the second device to participate in intercom communications; and
facilitate the intercom communications between the apparatus and the second device based on the contextual awareness information.

2. The apparatus of claim 1, wherein the information indicating to initiate the communications comprises information received from a voice command.

3. The apparatus of claim 1, wherein the apparatus is a voice-controlled electronic device.

4. The apparatus of claim 1, wherein the contextual awareness information comprises information related to an activity of the second device.

5. The apparatus of claim 4, wherein the activity comprises playing music, performing a search, providing audible information, or some combination thereof.

6. A method comprising:
receiving, at a microphone of a first device, information indicating to initiate intercom communications between the first device and a second device;
transmitting, from the first device, a request for the intercom communications to the second device;
in response to transmitting the request, receiving contextual awareness information corresponding to an ability of the second device to participate in intercom communications; and
facilitating the intercom communications between the first device and the second device based on the contextual awareness information.

7. The method of claim 6, wherein the information indicating to initiate the communications comprises information received from a voice command.

8. The method of claim 6, wherein the first device and the second device are voice-controlled electronic devices.

9. The method of claim 6, wherein the contextual awareness information comprises information related to an activity of the second device.

10. The method of claim 9, wherein the activity comprises playing music, performing a search, providing audible information, or some combination thereof.

11. The method of claim 6, wherein the contextual awareness information comprises information related to a user near the second device.

12. The method of claim 6, wherein the contextual awareness information comprises an audible response, a setting, a selection, or some combination thereof corresponding to a user of the second device.

13. The method of claim 6, further comprising facilitating the communications between the first device and the second device based on a user of the first device.

14. The method of claim 6, further comprising facilitating the communications between the first device and the second device based on a hierarchical relationship corresponding to a first user of the first device and a second user of the second device.

15. A program product comprising a computer readable storage medium that stores code executable by a processor, the executable code comprising code to perform:
receiving, at a microphone of a first device, information indicating to initiate intercom communications between the first device and a second device;
transmitting, from the first device, a request for the intercom communications to the second device;
in response to transmitting the request, receiving contextual awareness information corresponding to an ability of the second device to participate in intercom communications; and facilitating the intercom communications between the first device and the second device based on the contextual awareness information.

16. The program product of claim 15, wherein the contextual awareness information comprises information related to an activity of the second device.

17. The program product of claim 15, wherein the contextual awareness information comprises information related to a user near the second device.

18. The program product of claim 15, wherein the contextual awareness information comprises an audible response, a setting, a selection, or some combination thereof corresponding to a user of the second device.

19. The program product of claim 15, wherein the executable code further comprises code to perform facilitating the communications between the first device and the second device based on a user of the first device.

20. The program product of claim 15, wherein the executable code further comprises code to perform facilitating the communications between the first device and the second device based on a hierarchical relationship corresponding to a first user of the first device and a second user of the second device.

* * * * *